(12) United States Patent
Larson et al.

(10) Patent No.: US 11,247,721 B2
(45) Date of Patent: Feb. 15, 2022

(54) DEVICES AND METHODS TO DETERMINE STEERING ASSEMBLY SEALING INTEGRITY

(71) Applicant: GM GLOBAL TECHNOLOGY OPERATIONS LLC, Detroit, MI (US)

(72) Inventors: Travis S. Larson, Washington Township, MI (US); George E. Doerr, Davisburg, MI (US)

(73) Assignee: GM Global Technology Operations LLC, Detroit, MI (US)

(*) Notice: Subject to any disclaimer, the term of this patent is extended or adjusted under 35 U.S.C. 154(b) by 26 days.

(21) Appl. No.: 16/784,794

(22) Filed: Feb. 7, 2020

(65) Prior Publication Data

US 2021/0245802 A1 Aug. 12, 2021

(51) Int. Cl.
  *B62D 5/04* (2006.01)
(52) U.S. Cl.
  CPC ......... *B62D 5/0481* (2013.01); *B62D 5/0484* (2013.01)
(58) Field of Classification Search
  CPC .................. B62D 5/0481; B62D 5/0484
  See application file for complete search history.

(56) References Cited

U.S. PATENT DOCUMENTS 5,517,415 A * 5/1996 Miller .................. H02P 3/065
  701/43
2020/0339176 A1* 10/2020 Cao ..................... B62D 1/187

FOREIGN PATENT DOCUMENTS

DE   102012019427 A1 * 4/2014  ........... B62D 5/0481
JP   2012240435 A * 12/2012  ........... B62D 5/0481

* cited by examiner

*Primary Examiner* — Kevin R Steckbauer
(74) *Attorney, Agent, or Firm* — Quinn IP Law (57) ABSTRACT

Determining a sealing integrity of a steering assembly determining when the steering assembly is performing a steering event, determining an expected pressure change associated with the steering event, and receiving data from the pressure sensing member. During performance of the steering event, the controller analyzes the data from the pressure sensing member and determines when the pressure sensing member detects the expected pressure change and reduces an incident counter. When the pressure sensing member does not detect the expected pressure change, the incident counter is increased.

20 Claims, 4 Drawing Sheets

DEVICES AND METHODS TO DETERMINE STEERING ASSEMBLY SEALING INTEGRITY

INTRODUCTION

The present disclosure relates generally to devices and methods for detecting steering assembly sealing integrity.

A steering gear rack boot is an expandable member that creates a seal over the joint between the steering gear housing and the inner tie rod of a steering gear assembly. Current steering gear rack boots can fail, allowing for intrusion of water and other contaminants into the joint.

SUMMARY

Embodiments according to the present disclosure provide a number of advantages. For example, embodiments according to the present disclosure use changes in internal pressure in the steering gear assembly to detect a crack or opening in the steering gear assembly that may result in water intrusion.

In one aspect of the present disclosure, a method for determining a sealing integrity of a steering assembly includes providing a steering assembly including a steering gear housing defining a housing volume, a first boot coupled to the steering gear housing and defining a first boot volume, a second boot coupled to the steering gear housing and defining a second boot volume, a pressure sensing member configured to detect a pressure change within the steering assembly, and a controller in electronic communication with the pressure sensing member. The method includes determining, by the controller, when the steering assembly is performing a steering event and determining an expected pressure change associated with the steering event, receiving, by the controller, data from the pressure sensing member, when the steering assembly is performing the steering event, analyzing, by the controller, the data from the pressure sensing member, and determining, by the controller, when the pressure sensing member detects the expected pressure change and reducing an incident counter and determining when the pressure sensing member does not detect the expected pressure change and increasing the incident counter.

In some aspects, the method further includes determining, by the controller, when the incident counter exceeds a predetermined threshold, and when the incident counter exceeds the predetermined threshold, setting, by the controller, a diagnostic code.

In some aspects, the pressure sensing member comprises a first pressure sensing member coupled to the first boot volume and configured to detect a first pressure change within the first boot volume and a second pressure sensing member coupled to the second boot volume and configured to detect a second pressure change within the second boot volume.

In some aspects, the first pressure sensing member is a first switch configured to change state when a first pressure in the first boot housing is greater than a reference pressure and the second pressure sensing member is a second switch configured to change state when a second pressure in the second boot housing is greater than the reference pressure.

In some aspects, the method further includes providing a vehicle sensor configured to generate sensor data regarding the steering event and analyzing, by the controller, the sensor data to determine if a state change in the first pressure sensing member is expected or if a state change in the second pressure sensing member is expected.

In some aspects, the incident counter includes a first incident counter associated with the first boot volume and a second incident counter associated with the second boot volume.

In some aspects, when the first pressure sensing member changes state as expected, the method further includes reducing the first incident counter and when the first pressure member does not change state as expected, the method further includes increasing the first incident counter.

In some aspects, when the second pressure sensing member changes state as expected, the method further includes reducing the second incident counter and when the second pressure member does not change state as expected, the method further includes increasing the second incident counter.

In some aspects, the steering assembly further comprises a first check valve connecting the first boot volume with an ambient atmosphere and a second check valve connecting the second boot volume with the ambient atmosphere, the pressure sensing member is a pressure sensing switch coupled to the housing volume and configured to change state when a housing pressure is greater than the reference pressure and the method further comprises, when the pressure sensing switch changes state, determining, by the controller, an elapsed time until the housing pressure equals the reference pressure.

In some aspects, the method further includes comparing, by the controller, the elapsed time to a leak down time and, when the elapsed time is less than the leak down time, increasing the incident counter and when the elapsed time is greater than the leak down time, reducing the incident counter.

In another aspect of the present disclosure, a steering assembly for an automotive vehicle includes a steering rack coupled to a first tie rod and a second tie rod, a steering gear housing defining a housing volume, the steering gear housing enclosing the steering rack, a first boot coupled to the steering gear housing and defining a first boot volume, a second boot coupled to the steering gear housing and defining a second boot volume, a first pressure sensing member coupled to the steering gear housing and configured to detect a pressure change within the first boot volume, a second pressure sensing member coupled to the steering gear housing and configured to detect a pressure change within the second boot volume, and a controller in electronic communication with the first and second pressure sensing members. The controller is configured to determine when the steering assembly is performing a steering event and determine a first boot volume condition and a second boot volume condition, receive data from the first and second pressure sensing members, when the steering assembly is performing the steering event, analyze the data from the first pressure sensing member and when the first boot volume condition is satisfied, reduce a first incident counter and when the first boot volume condition is not satisfied, increase the first incident counter, and when the steering assembly is performing the steering event, analyze the data from the second pressure sensing member and when the second boot volume condition is satisfied, reduce a second incident counter and when the second boot volume condition is not satisfied, increase the second incident counter.

In some aspects, the first boot volume condition is a first expected pressure change in the first boot volume associated with the steering event and the second boot volume condition is a second expected pressure change in the second boot volume associated with the steering event.

In some aspects, the first boot volume condition is satisfied when the first pressure sensing member detects the first expected pressure change.

In some aspects, the second boot volume condition is satisfied when the second pressure sensing member detects the second expected pressure change.

In some aspects, the first incident counter is associated with the first boot volume and the second incident counter is associated with the second boot volume.

In some aspects, the controller is further configured to determine when either the first or the second incident counter exceeds a predetermined threshold, and, when either the first or the second incident counter exceeds the predetermined threshold, set a diagnostic code.

In some aspects, the first pressure sensing member is a first switch configured to change state when a first pressure in the first boot housing is greater than a reference pressure and the second pressure sensing member is a second switch configured to change state when a second pressure in the second boot housing is greater than the reference pressure.

In some aspects, the steering assembly further includes a vehicle sensor configured to generate sensor data regarding the steering event and the controller is further configured to analyze the sensor data to determine if a state change in the first pressure sensing member is expected or if a state change in the second pressure sensing member is expected.

In another aspect of the present disclosure, a steering assembly for an automotive vehicle includes a steering rack coupled to a first tie rod and a second tie rod, a steering gear housing defining a housing volume, the steering gear housing enclosing the steering rack, a first boot coupled to the steering gear housing and defining a first boot volume, a second boot coupled to the steering gear housing and defining a second boot volume, a first check valve connecting the first boot volume with an ambient atmosphere, a second check valve connecting the second boot volume with the ambient atmosphere, a pressure sensing member coupled to the steering gear housing and configured to detect a pressure change within the housing volume, and a controller in electronic communication with the pressure sensing member. The controller is configured to determine when the steering assembly is performing a steering event, receive pressure data from the pressure sensing member, when the steering assembly is performing the steering event, analyze the pressure data from the pressure sensing member and when the pressure sensing member detects the pressure change, measure an elapsed time until the pressure sensing member does not detect the pressure change, compare the elapsed time to a leak down threshold time, when the elapsed time is less than the leak down threshold time, increase the incident counter, and when the elapsed time is greater than the leak down threshold time, decrease the incident counter.

In some aspects, the controller is further configured to determine when the incident counter exceeds a predetermined threshold, and, when the incident counter exceeds the predetermined threshold, set a diagnostic code.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
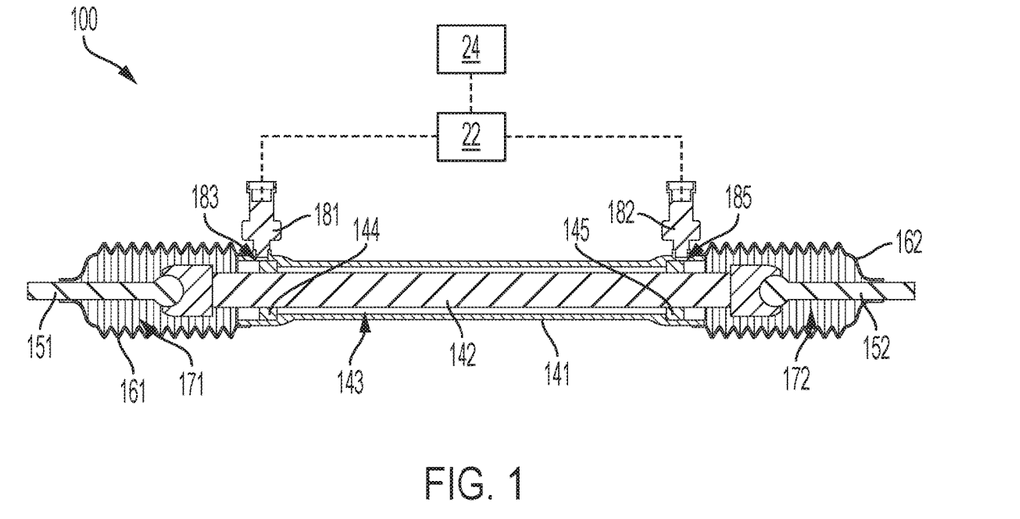
FIG. 1 is a schematic side cutaway view of a steering assembly for a vehicle in a first pressure state, according to an embodiment.
Figure 2:
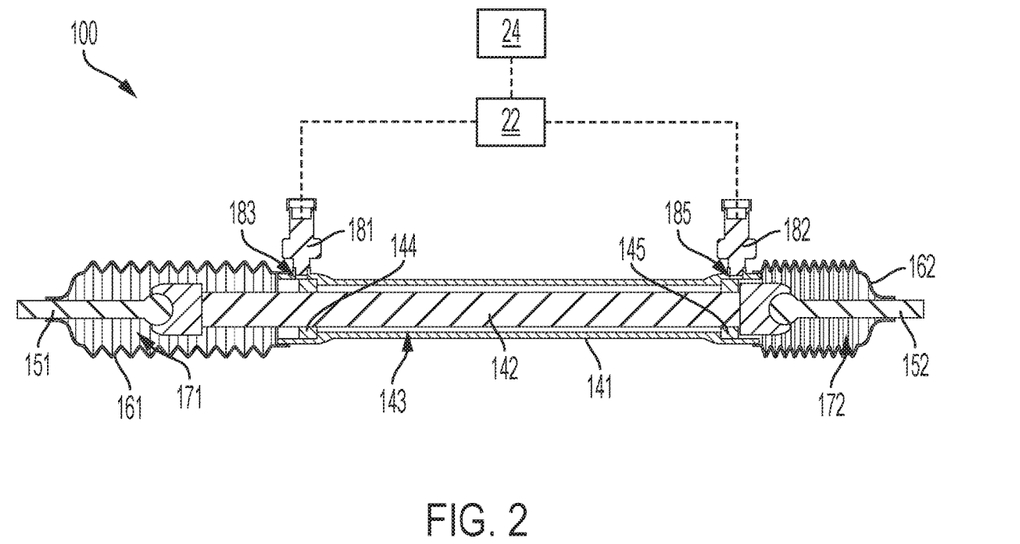
FIG. 2 is a schematic side cutaway view of the steering assembly of FIG. 1 in a second pressure state, according to an embodiment.

Referring to the drawings, wherein like reference numbers correspond to like or similar components whenever possible throughout the several figures, there is shown in FIGS. 1 and 2 a portion of a vehicle (not numbered). In particular, FIGS. 1 and 2 illustrate a steering assembly 100 for the vehicle.

Damaged inner tie rod boots make up a large percentage of field issues for steering assemblies. Current methods to detect sealing integrity rely on a system failure or performance degradation before the failure can be identified. The devices and methods discussed herein identify a damaged component of the steering assembly 100, such as a boot, or a lack of sealing integrity of the steering assembly 100, prior to a system or performance issue.

In various embodiments, a steering assembly includes a rack and pinion steering gear (not shown) that translates rotational movement of a steering wheel (not shown) into lateral movement of a pair of tie rods. Although the steering assembly is described herein as rack and pinion, other configurations may alternatively be utilized within the scope of the disclosure herein, such as, for example and without limitation, electronic steering assemblies and steering assemblies for autonomous vehicles that may or may not include a steering wheel.

With reference to FIGS. 1 and 2, in one embodiment, a steering assembly 100 for an electronic power steering system includes a steering gear housing 141 enclosing a steering rack 142 within a housing volume 143. The steering rack 142 is coupled to a first tie rod 151 and a second tie rod 152. A first boot 161 is coupled to the steering gear housing 141 and encloses the joint between the first tie rod 151 and the steering rack 142. A second boot 162 is coupled to the steering gear housing 141 and encloses the joint between the second tie rod 152 and the steering rack 142. The first boot 161 defines a first boot volume 171 and the second boot 162 defines a second boot volume 172. In one embodiment, each boot 161, 162 is a bellows design formed from a malleable plastic or other material that can collapse and expand based on changes in pressure within the boot 161, 162.

A first separating member 144 separates the first boot volume 171 from the housing volume 143 and a second separating member 145 separates the second boot volume 172 from the housing volume 143. The first and second separating members 144, 145 separate the three volumes such that the first boot volume 171 defines a first pressure chamber, the housing volume 143 defines a second pressure chamber, and the second boot volume 172 defines a third pressure chamber.

In various embodiments, as shown in FIGS. 1 and 2, the steering assembly 100 includes a first pressure sensing member 181 and a second pressure sensing member 182. In various embodiments, the first and second pressure sensing members 181, 182 are pressure sensors or pressure switches. The first pressure sensing member 181 is connected to a first orifice 183 formed in the housing 141 such that the first orifice 183 opens into the first boot volume 171. Similarly, the second pressure sensing member 182 is connected to a second orifice 185 formed in the housing 141 such that the second orifice 185 opens into the second boot volume 172. The first pressure sensing member 181 is configured to detect a change in pressure of a fluid within the first boot volume 171, and similarly, the second pressure sensing member 182 is configured to detect a change in pressure of a fluid within the second boot volume 172. In various embodiments, the fluid contained within each of the first and second volumes 171, 172 is a gaseous fluid such as air.

Each of the first and second pressure sensing members 181, 182 is in electronic communication with at least one controller, such as a controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the connected components. In various embodiments, the controller 22 is also in electronic communication with various other vehicle sensors 24, including, for example and without limitation, a steering wheel angle sensor or other sensor configured to generate data regarding a steering status such as a steering maneuver or event.

As shown in FIGS. 1 and 2, the first and second boots 161, 162 can flex, collapse, and/or expand such that the first and second boot volumes 171, 172 change size. The change in size of the first and second boot volumes 171, 172 is based on the state of the steering assembly, that is, whether the steering assembly is in a static state or dynamic state. In the static state, the first and second boot volumes 171, 172 are approximately equal and the steering system is not being used to steer a vehicle. In the dynamic state, the first boot volume 171 is not equal to the second boot volume 172, with either the first boot volume 171 or the second boot volume 172 being greater depending on the direction of movement of the rack of the steering assembly.

With reference to FIG. 1, in the static state, that is, when the steering assembly 100 is not being controlled to steer or turn a vehicle, the first and second boot volumes 171, 172 are approximately the same size and the pressure in each of the three pressure chambers is equalized. However, FIG. 2 illustrates the steering assembly 100 in the dynamic state in which the first boot volume 171 is larger than the second boot volume 172. The housing 141 defining the housing volume 143 is rigid such that the housing volume 143 does not change size when the steering assembly 100 is in the dynamic state.

The change in size of the first and second boot volumes 171, 172 affects the pressure of the fluid contained within each of the first and second boot volumes 171, 172. As shown in FIG. 2, the pressure within the second pressure chamber defined by the housing volume 143 is equal to an initial, or reference, pressure $P_0$. In some embodiments, including the embodiment illustrated in FIGS. 1 and 2, the first pressure sensing member 181 is configured to detect a change in pressure within the first boot volume 171 above the reference pressure $P_0$. Similarly, the second pressure sensing member 182 is configured to detect a change in pressure within the second boot volume 172 above the reference pressure $P_0$. Each of the pressure sensing members 181, 182 is in electronic communication with the controller 22 that is programmed with an expected reference pressure $P_0$ determined from various factors including, but not limited to, the steering assembly configuration and vehicle configuration. When the steering assembly is static, that is, there is not a steering event, the pressures in the first boot volume 171, the housing volume 143, and the second boot volume 172 are substantially equal.

When the first boot 161 expands due to movement of the steering rack 142 during a steering event such that the first boot volume 171 increases in size, a pressure $P_1$ in the first boot volume 171 is less than the reference pressure $P_0$. Simultaneously, as the steering rack 142 moves during the steering event, the second boot 162 collapses such that the second boot volume 172 decreases in size and a pressure $P_3$ in the second boot volume 172 is greater than the reference pressure $P_0$. In response to the increase in pressure in the second boot volume 172, the second pressure sensing member 182 changes state, that is, in embodiments in which the second pressure sensing member 182 is a switch, the switch will change state such as from an off state to an on state. The state change data of the second pressure sensing member 182 is transmitted to the controller 22.

During normal steering assembly operation (that is, operation with steering assembly sealing integrity), the pressures within the three volumes (first, second, and housing) will equalize when the steering event is completed. However, if the pressures within the three volumes do not change during a steering event, the absence of state change data transmitted to the controller 22 is used to determine if sealing integrity of the steering assembly 100 has been compromised.

Figure 3:
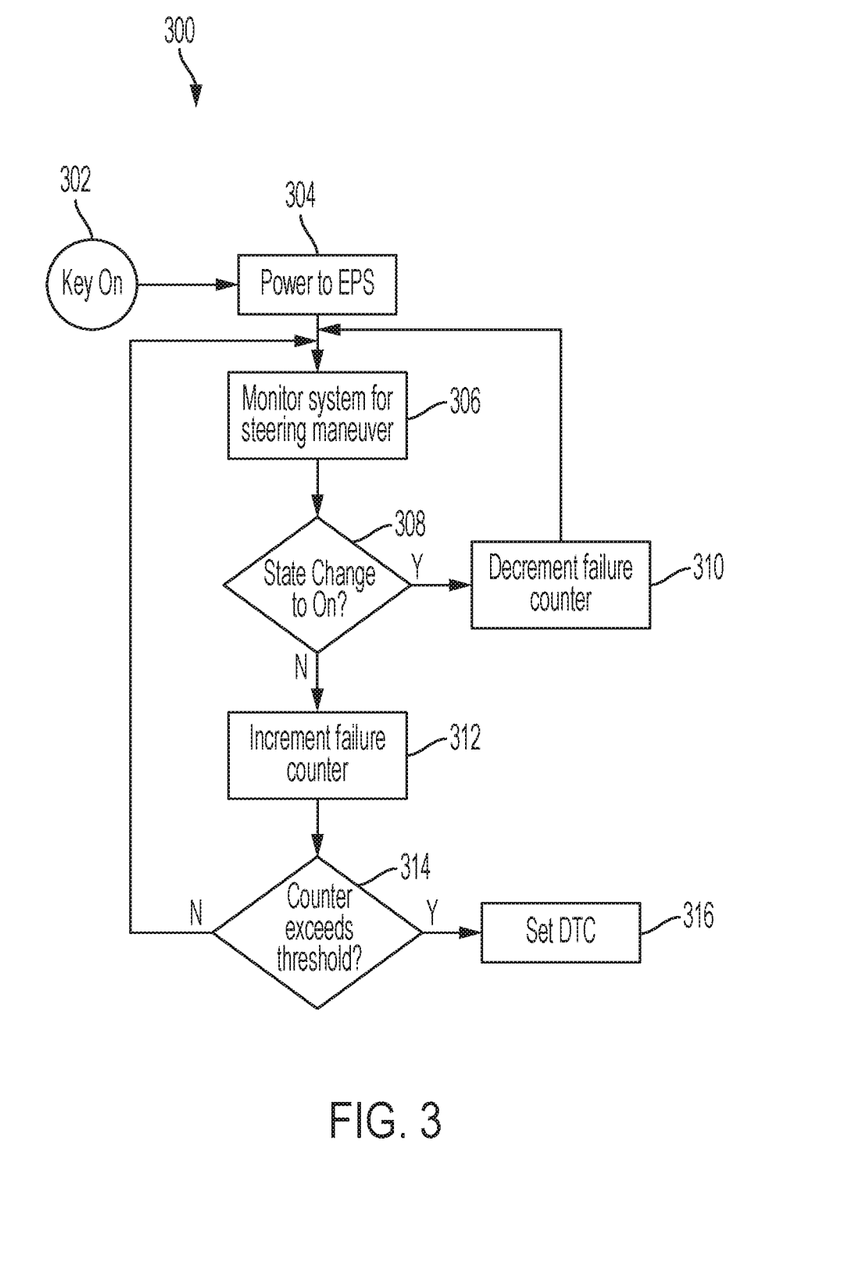
FIG. 3 is a flowchart of a method for detecting steering assembly pressure changes, according to an embodiment.

FIG. 3 illustrates a method 300 to detect sealing integrity of a steering assembly. The method 300 can be utilized in connection with the steering assembly 100 illustrated in FIGS. 1 and 2. The method 300 can be utilized in connection with the controller 22 as discussed herein, or by other systems associated with or separate from the vehicle, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure.

The method 300 begins at 302 with a key on condition. Next, at 304, power is provided to the electronic power steering system including the steering assembly 100. The method 300 continues to 306, wherein the controller 22 monitors the steering assembly 100 for a steering maneuver or event. Monitoring the steering assembly 100 includes, in various embodiments, continuously or periodically receiving data from one or both of the pressure sensing members 181, 182 regarding a state change. Monitoring the steering assembly 100 also includes, in various embodiments, receiving data from one or more vehicle sensors indicating a steering event, such as input from a steering wheel, etc., for example and without limitation. Monitoring the steering assembly 100 also includes, in various embodiments, determining an expected pressure change associated with the steering event. The expected pressure change is, in some embodiments, an expected pressure change in one or more of the first boot volume, the housing volume, and the second boot volume. When data received by the controller 22 indicates a steering event or maneuver, the method 300 proceeds to 308.

Next, at 308, the controller 22 determines whether one of the pressure sensing members 181, 182 detects the expected pressure change, that is, in some embodiments, one of the pressure sensing members is registering a state change, such as a state change from off to on. As noted herein, a state change of the first pressure sensing member 181 from off to on indicates that the pressure $P_1$ within the first boot volume 171 is greater than the reference pressure $P_0$. Similarly, a state change of the second pressure sensing member 182 from off to on indicates that the pressure $P_3$ within the second boot volume 172 is greater than the reference pressure $P_0$.

If the determination at 308 is positive, that is, one of the pressure sensing members 181, 182 has changed state from off to on, indicating that a pressure in the associated boot volume is greater than the reference pressure $P_0$, the method 300 proceeds to 310. At 310, the controller 22 reduces an incident counter. The incident counter is a count of the number of occurrences of a lack of state change of each of the pressure sensing members 181, 182, as would be expected given the steering event data received by the controller 22. In various embodiments, a separate incident counter is maintained for each pressure sensing member 181, 182 such that a failure to register a change in state may be monitored for each boot 161, 162 of the steering assembly 100. Receipt by the controller 22 of data indicating the state change from the pressure sensing members 181, 182 is indicative of continued sealing integrity of the boot associated with the pressure sensing member registering the state change. From 310, the method 300 returns to 306 and proceeds as discussed herein.

If the determination at 308 is negative, that is, one of the pressure sensing members 181, 182 has not changed state from off to on, indicating that the pressure in the associated boot volume is not greater than the reference pressure $P_0$, as would be expected given the steering event data, the method 300 proceeds to 312. At 312, the controller 22 increments the incident counter to indicate that the expected pressure change information has not been received for the associated boot volume.

The method 300 proceeds to 314, wherein the controller 22 determines whether the incident counter exceeds a predetermined threshold. In various embodiments, the predetermined threshold is a predetermined number of instances in which the expected pressure change information has not been received for the associated boot volume. The predetermined threshold is determined, in various embodiments, on factors such as the vehicle configuration, steering system configuration, or other factors, without limitation.

If the determination at 314 is positive, that is, that the incident counter exceeds the predetermined threshold, the method 300 proceeds to 316 and the controller 22 sets a diagnostic trouble code (DTC). In various embodiments, the controller 22 also informs the operator of the diagnostic issue via a visual or auditory message, or haptic feedback, for example and without limitation.

If the determination at 314 is negative, that is, that the incident counter does not exceed the predetermined threshold, the method 300 returns to 306 and proceeds as discussed herein.

In various embodiments, a first incident counter is associated with the first boot volume and a second incident counter is associated with the second boot volume. The two separate incident counters allow the controller 22 to determine whether the first or the second boot has a sealing integrity issue.

Figure 4:
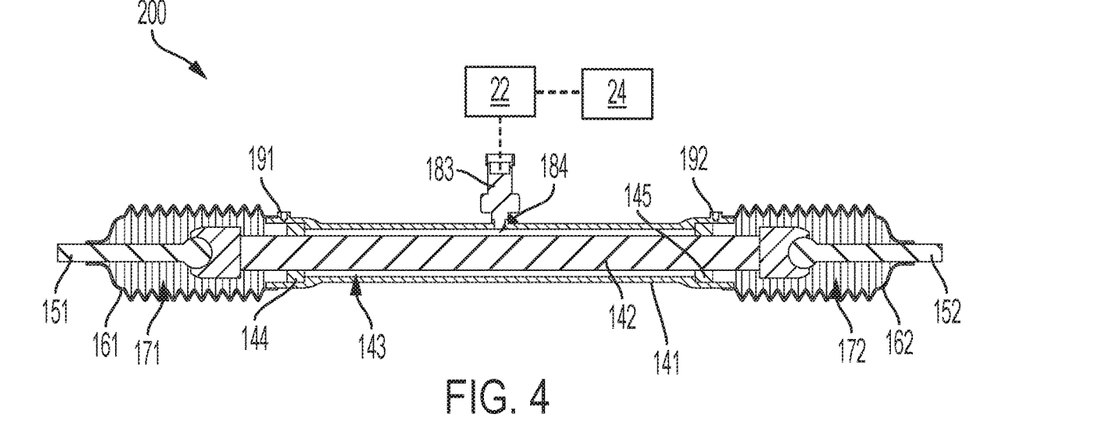
FIG. 4 is a schematic side cutaway view of a steering assembly for a vehicle in a first pressure state, according to another embodiment.
Figure 5:
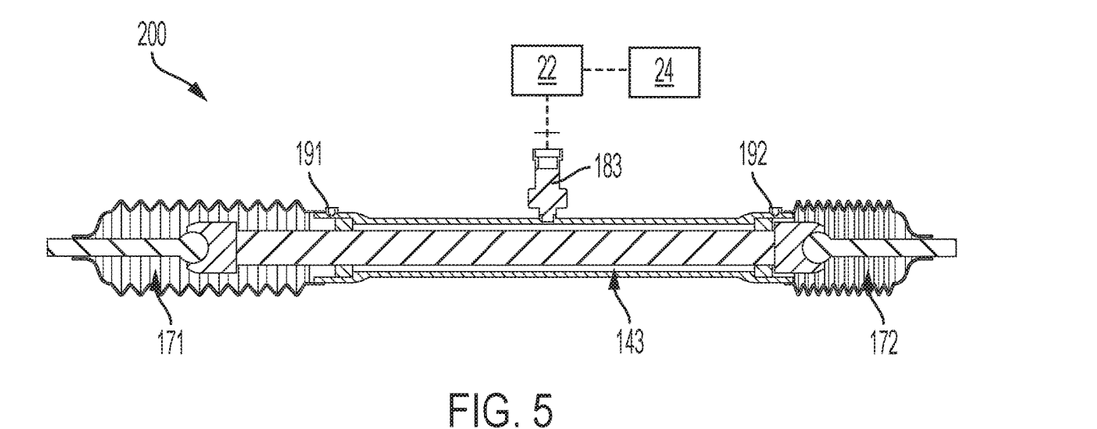
FIG. 5 is a schematic side cutaway view of a steering assembly of FIG. 4 in a second pressure state, according to an embodiment.
Figure 6:
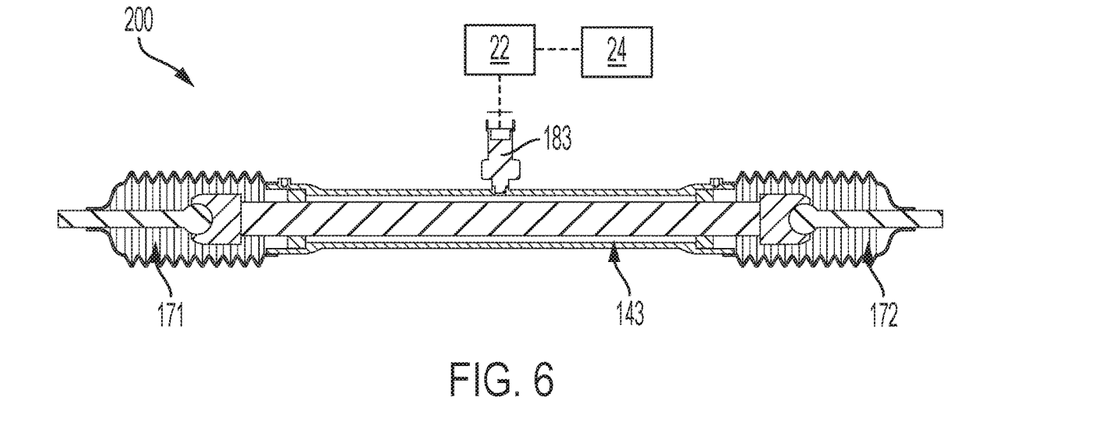
FIG. 6 is a schematic side cutaway view of a steering assembly of FIG. 4 in a third pressure state, according to an embodiment.

With reference to FIGS. 4-6, in one embodiment, a steering assembly 200 for an electronic power steering system includes a steering gear housing 141 enclosing a steering rack 142 within a housing volume 143. The steering rack 142 is coupled to a first tie rod 151 and a second tie rod 152. A first boot 161 encloses the joint between the first tie rod 151 and the steering rack 142. A second boot 162 encloses the joint between the second tie rod 152 and the steering rack 142. The first boot 161 defines a first boot volume 171 and the second boot 162 defines a second boot volume 172. In one embodiment, each boot 161, 162 is a bellows design formed from a malleable plastic or other material that can collapse and expand based on changes in pressure within the boot 161, 162.

A first separating member 144 separates the first boot volume 171 from the housing volume 143 and a second separating member 145 separates the second boot volume 172 from the housing volume 143. The first and second separating members 144, 145 separate the three volumes such that the first boot volume 171 defines a first pressure chamber, the housing volume 143 defines a second pressure chamber, and the second boot volume 172 defines a third pressure chamber.

In various embodiments, as shown in FIGS. 4-6, the steering assembly 200 includes a pressure sensing member 183. In various embodiments, the pressure sensing member 183 is a pressure sensor or pressure switch. The first pressure sensing member 181 is connected to an orifice 184 formed in the housing 141 such that the orifice 184 opens into the housing volume 143. The pressure sensing member 183 is configured to detect a change in pressure of a fluid within the housing volume 143. In various embodiments, the fluid contained within each of the first and second volumes 171, 172 and the housing volume 143 is a gaseous fluid such as air. The pressure sensing member 183 is in electronic communication with at least one controller, such as the controller 22. The steering assembly 200 also includes a first check valve 191 that connects the first boot volume 171 with the atmosphere and a second check valve 192 that connects the second boot volume 172 with the atmosphere. In various embodiments, each of the first and second check valves 191, 192 are in electronic communication with at least one controller, such as the controller 22.

With reference to FIG. 4, in the static state, that is, when the steering assembly 200 is not being controlled to steer or turn a vehicle, the first and second boot volumes 171, 172 are approximately the same size and the pressure in each of the three pressure chambers is equalized. However, FIG. 5 illustrates the steering assembly 200 in the dynamic state in which the first boot volume 171 is larger than the second boot volume 172. The housing 141 defining the housing volume 143 is rigid such that the housing volume 143 does not change size when the steering assembly 200 is in the dynamic state.

The change in size of the first and second boot volumes 171, 172 affects the pressure of the fluid contained within each of the first and second boot volumes 171, 172. As shown in FIG. 5, the pressure within the second pressure chamber defined by the housing volume 143 is equal to an initial, or reference, pressure $P_0$. In some embodiments, including the embodiment illustrated in FIGS. 4-6, the pressure sensing member 183 is configured to detect a change in pressure within the housing volume 143 above the reference pressure $P_0$. The pressure sensing member 183 is in electronic communication with the controller 22 that is programmed with an expected reference pressure $P_0$ determined from various factors including, but not limited to, the steering assembly configuration and vehicle configuration. When the steering assembly is static, that is, there is not a steering maneuver or event, the pressures in the first boot volume 171, the housing volume 143, and the second boot volume 172 are substantially equal.

When the first boot 161 expands due to movement of the steering rack 142 during a steering event such that the first boot volume 171 increases in size, a pressure $P_1$ in the first boot volume 171 is less than the reference pressure $P_0$. Simultaneously, as the steering rack 142 moves during the steering event, the second boot 162 collapses such that the second boot volume 172 decreases in size and a pressure $P_3$ in the second boot volume 172 is greater than the reference pressure $P_0$. In response to the steering maneuver, the first check valve 191 opens to bring the low pressure or expanding side located in the first boot volume 171 up to atmospheric pressure. When the steering system pressure is again equalized across the three volumes (the first boot volume 171, the housing volume 143, and the second boot volume 172), the internal air density has increased, resulting in a higher static pressure that triggers a state change of the pressure sensing member 183. The state change data of the pressure sensing member 183 is transmitted to the controller 22.

During normal steering assembly operation (that is, operation with steering assembly sealing integrity), the pressures within the three volumes (first, second, and housing) will equalize when the steering event is completed. The pressure at which the steering system 200 will equalize is higher than the reference pressure $P_0$, which is typically the ambient atmospheric air pressure. Over time the pressure within the steering system 200 will leak down to the reference pressure $P_0$. Pressure leak down data is transmitted to the controller 22 to determine if sealing integrity of the steering assembly 200 has been compromised.

Figure 7:
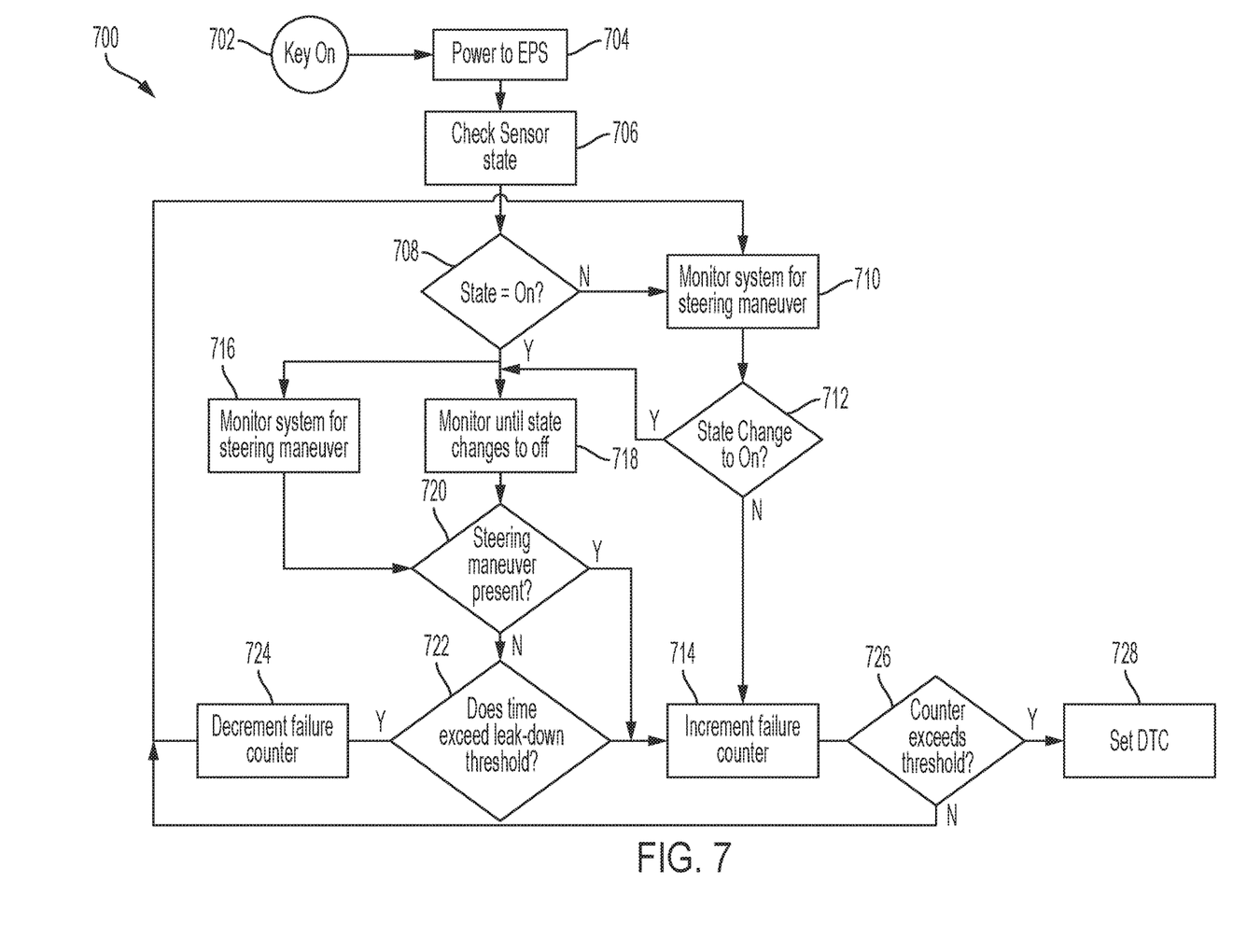
FIG. 7 is a flowchart of a method for detecting steering assembly pressure changes, according to another embodiment.

FIG. 7 illustrates a method 700 to detect sealing integrity of a steering system. The method 700 can be utilized in connection with the steering system 200 illustrated in FIGS. 4-6. The method 700 can be utilized in connection with the controller 22 as discussed herein, or by other systems associated with or separate from the vehicle, in accordance with exemplary embodiments. The order of operation of the method 700 is not limited to the sequential execution as illustrated in FIG. 7, but may be performed in one or more varying orders, or steps may be performed simultaneously, as applicable in accordance with the present disclosure.

The method 700 begins at 702 with a key on condition. Next, at 704, power is provided to the electronic power steering system including the steering assembly 200. The method 700 continues to 706, wherein the controller 22 monitors the state of the pressure sensing member 183 through continuous or periodic receipt and monitoring of state change data from the pressure sensing member 183. In various embodiments, monitoring the state of the pressure sensing member 183 includes determining when the pressure sensing member detects a pressure change.

Next, at 708, the controller 22 determines whether the data received from the pressure sensing member 183 indicates that the state change has changed from off to on. As discussed herein, a state change of the pressure sensing member 183 from off to on indicates that the pressure within the housing volume 143 is greater than the reference pressure $P_0$.

If the determination at 708 is negative, that is, the pressure sensing member 183 has not changed state from off to on, thereby indicating that the pressure in the housing volume 143 is not greater than the reference pressure $P_0$, the method 700 proceeds to 710. At 710, the controller 22 monitors the steering assembly 200 for a steering maneuver or event. Monitoring the steering assembly 200 includes, in various embodiments, receiving data from one or more sensors indicating a steering event, such as input from a steering wheel, etc., for example and without limitation. When data received by the controller 22 indicates a steering event or maneuver, the method 700 proceeds to 712.

At 712, the controller 22 again determines whether the data received from the pressure sensing member 183 indicates that the state change has changed from off to on, indicating that the pressure within the housing volume 143 is greater than the reference pressure $P_0$.

If the determination at 712 is negative, that is, the pressure sensing member 183 has not changed state from off to on indicating that the pressure in the housing volume 143 is not greater than the reference pressure $P_0$, as would be expected given the steering event data, the method 700 proceeds to 714. At 714, the controller 22 increments an incident counter to indicate that the expected pressure change information has not been received for the housing volume 143, indicating a possible lack of sealing integrity of the steering assembly 200.

If the determination at both 708 and 712 is positive, that is, the pressure sensing member 183 has changed state from off to on, indicating that the pressure in the housing volume 143 volume is greater than the reference pressure $P_0$, the method 700 proceeds to steps 716 and 718 which may be performed sequentially or simultaneously, in various embodiments. At 716, the controller 22 monitors the steering assembly 200 for a steering maneuver or event. Monitoring the steering assembly 200 includes, in various embodiments, receiving data from one or more sensors indicating a steering event, such as input from a steering wheel, etc., for example and without limitation. At 718, the controller 22 monitors the data received from the pressure sensing member 183 and starts a timer to determine an elapsed time until the state change of the pressure sensing member 183 changes from on to off. From both 716 and 718, the method 700 proceeds to 720. In various embodiments, the timer is a component of the controller 22 or is in communication with the controller 22.

At 720, the controller 22 determines whether a steering maneuver or event is occurring. To make this determination, the controller 22 receives and analyzes data from one or more sensors indicating a steering event, such as input from a steering wheel, etc., for example and without limitation.

If the determination at 720 is negative, that is, the sensor data does not indicate that a steering maneuver or event is occurring, the method 700 proceeds to 722. At 722, the controller 22 determines whether the elapsed time measured by the timer at 718 exceeds a predetermined leak down threshold. The leak down threshold is a predetermined elapsed time determined to be the threshold separating an expected leak down duration and an unexpected leak down duration. For a normally operating steering assembly 200, that is, the steering assembly 200 is operating with expected sealing integrity, the elapsed time or leak down time until the pressure sensing member 183 changes from the on state to the off state exceeds the predetermined leak down threshold. Similarly, when the steering assembly 200 is operating without the expected sealing integrity, the elapsed time or leak down time until the pressure sensing member 183 changes from the on state to the off state is lower than the predetermined leak down threshold. In other words, the lack of sealing integrity results in a shorter elapsed time until the state change by the pressure sensing member 183 than when the steering assembly 200 is operating with expected sealing integrity.

If the determination at 722 is positive, that is, the elapsed time or leak down time is greater than the predetermined leak down threshold, the method 700 proceeds to 724. As discussed herein, when the elapsed time is greater than the predetermined leak down threshold, the timer data is indicative of continued sealing integrity of the steering assembly 100. At 724, the controller 22 reduces the incident counter. The method 700 then proceeds to 710 and continues as discussed herein.

If the determination at 722 is negative, that is, the elapsed time or leak down time is less than the predetermined leak down threshold, the method 700 proceeds to 714. At 714, as discussed herein, the controller 22 increments an incident counter to indicate that the elapsed time or leak down time is shorter than expected, indicating a possible lack of sealing integrity of the steering assembly 200.

From 714, the method 700 proceeds to 726. At 726, the controller 22 determines whether the incident counter exceeds a predetermined incident threshold. In various embodiments, the predetermined incident threshold is a predetermined number of instances in which the expected pressure change information has not been received for the housing volume 143 and/or the elapsed time or leak down time measured by the timer is shorter than the predetermined leak down threshold. The predetermined incident threshold is determined, in various embodiments, on factors such as the vehicle configuration, steering system configuration, or other factors, without limitation.

If the determination at 726 is positive, that is, that the incident counter exceeds the predetermined incident threshold, the method 700 proceeds to 728 and the controller 22 sets a diagnostic trouble code (DTC). In various embodiments, the controller 22 also informs the operator of the diagnostic issue via a visual or auditory message, or haptic feedback, for example and without limitation.

If the determination at 726 is negative, that is, that the incident counter does not exceed the predetermined incident threshold, the method 700 returns to 710 and proceeds as discussed herein.

While the methods discussed herein focus on determining the sealing integrity of one side of the steering assembly 100, 200, it is understood that the methods and devices can also be used to determine the sealing integrity of either side of the steering assembly 100, 200. That is, the devices and methods discussed herein can be used in various embodiments to determine the sealing integrity of either or both of the first and second boots 161, 162.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for determining a sealing integrity of a steering assembly, the method comprising:
   providing a steering assembly including a steering gear housing defining a housing volume, a first boot coupled to the steering gear housing and defining a first boot volume, a second boot coupled to the steering gear housing and defining a second boot volume, a pressure switch configured to toggle between two states in response to each transition of a pressure within the steering assembly through a predetermined reference pressure, and a controller in electronic communication with the pressure switch;
   determining, by the controller, that the steering assembly is performing a steering event;
   determining, by the controller, an expected pressure change associated with the steering event;
   receiving, by the controller, data from the pressure switch that indicates a current state of the two states during the steering event;
   analyzing, by the controller, the data from the pressure switch during the steering event;
   reducing an incident counter, by the controller, in response to the current state of the pressure switch confirming the expected pressure change; and
   increasing the incident counter, by the controller, in response to the current state of the pressure switch refuting the expected pressure change.

2. The method of claim 1 further comprising:
   determining, by the controller, that the incident counter exceeds a predetermined threshold; and
   setting, by the controller, a diagnostic code based on the determining.

3. The method of claim 1, wherein the pressure switch comprises a first pressure switch coupled to the first boot volume and responsive to a first pressure within the first boot volume, and a second pressure switch coupled to the second boot volume and responsive to a second pressure within the second boot volume.

4. The method of claim 3 further comprising:
   generating, with a vehicle sensor, sensor data regarding the steering event; and
   analyzing, by the controller, the sensor data to determine if a first state change in the first pressure switch is expected and if a second state change in the second pressure switch is expected.

5. The method of claim 4, wherein the incident counter includes a first incident counter associated with the first boot volume and a second incident counter associated with the second boot volume.

6. The method of claim 5, further comprising:
reducing the first incident counter in response to the first state change occurring during the steering event; and
increasing the first incident counter in response to the first state change not occurring during the steering event.

7. The method of claim 5, further comprising:
reducing the second incident counter in response to the second state change occurring during the steering event; and
increasing the second incident counter in response to the second state change occurring during the steering event.

8. The method of claim 1, wherein the steering assembly further comprises a first check valve connecting the first boot volume with an ambient atmosphere and a second check valve connecting the second boot volume with the ambient atmosphere, the pressure switch is coupled to the housing volume and configured to detect the pressure in the housing volume, the method further comprises:
determining, by the controller, an elapsed time until the pressure in the housing volume matches a reference pressure.

9. The method of claim 8 further comprising:
increasing the incident counter in response to the elapsed time being less than a leak down time; and
reducing the incident counter in response to the elapsed time being greater than the leak down time.

10. The method of claim 1, wherein the first boot volume, the housing volume, and the second boot volume are in fluid isolation from each other.

11. A steering assembly for an automotive vehicle, the steering assembly comprising:
a steering rack;
a steering gear housing defining a housing volume, the steering gear housing enclosing the steering rack;
a first boot coupled to the steering gear housing and defining a first boot volume;
a second boot coupled to the steering gear housing and defining a second boot volume;
a first pressure switch coupled to the steering gear housing and configured to toggle between two states in response to each transition of a first pressure within the first boot volume through a predetermined reference pressure;
a second pressure switch coupled to the steering gear housing and configured to toggle between the two states in response to each transition of a second pressure within the second boot volume through the predetermined reference pressure; and
a controller in electronic communication with the first pressure switch and the second pressure switch, and configured to:
determine that the steering assembly is performing a steering event;
receive first data from the first pressure switch that indicates a first current state of the first pressure switch during the steering event;
determine a first boot volume condition during the steering event in response to the first current state of the first pressure switch;
receive second data from the second pressure switch that indicates a second current state of the second pressure switch during the steering event;
determining a second boot volume condition during the steering event in response to the second current state of the second pressure switch;
analyze the first data from the first pressure switch during the steering event;
reduce a first incident counter in response to satisfaction of the first boot volume condition;
increase the first incident counter in response to dissatisfaction of the first boot volume condition;
analyze the second data from the second pressure switch;
reduce a second incident counter in response to satisfaction of the second boot volume condition; and
increase the second incident counter in response to dissatisfaction of the second boot volume condition.

12. The steering assembly of claim 11, wherein the first boot volume condition is a first expected pressure in the first boot volume associated with the steering event, and the second boot volume condition is a second expected pressure in the second boot volume associated with the steering event.

13. The steering assembly of claim 12, wherein the first boot volume condition is satisfied in response to the first expected pressure exceeding the predetermined reference pressure.

14. The steering assembly of claim 13, wherein the second boot volume condition is satisfied in response to the second expected pressure exceeding the predetermined reference pressure.

15. The steering assembly of claim 14, wherein the first incident counter is associated with the first boot volume and the second incident counter is associated with the second boot volume.

16. The steering assembly of claim 15, wherein the controller is further configured to:
determine that one or more of the first incident counter and the second incident counter exceeds a predetermined threshold; and
set a diagnostic code based on the determination.

17. The steering assembly of claim 11 further comprising:
a vehicle sensor configured to generate sensor data regarding the steering event; and
the controller is further configured to analyze the sensor data to determine if a first state change is expected in the first pressure switch and if a second state change is expected in the second pressure switch.

18. The steering assembly of claim 11, wherein the first boot volume, the housing volume, and the second boot volume are in fluid isolation from each other.

19. A steering assembly for an automotive vehicle, the steering assembly comprising:
a steering assembly including a steering gear housing defining a housing volume, a first boot coupled to the steering gear housing and defining a first boot volume, and a second boot coupled to the steering gear housing and defining a second boot volume;
a pressure switch configured to toggle between two states in response to each transition of a pressure within the steering assembly through a predetermined reference pressure; and
a controller in electronic communication with the pressure switch, and configured to:
determine that the steering assembly is performing a steering event;
determine an expected pressure change associated with the steering event;
receive data from the pressure switch that indicates a current state of the two states during the steering event;
analyze the data from the pressure switch during the steering event;

reduce an incident counter in response to the current state of the pressure switch confirming the expected pressure change; and increase the incident counter in response to the current state of the pressure switch refuting the expected pressure change.

20. The steering assembly of claim 19, wherein the first boot volume, the housing volume, and the second boot volume are in fluid isolation from each other.

* * * * *